Sept. 5, 1939.  A. B. POOLE  2,171,987
SYNCHRONOUS ELECTRIC MOTOR STRUCTURE
Filed Dec. 3, 1937  4 Sheets-Sheet 1
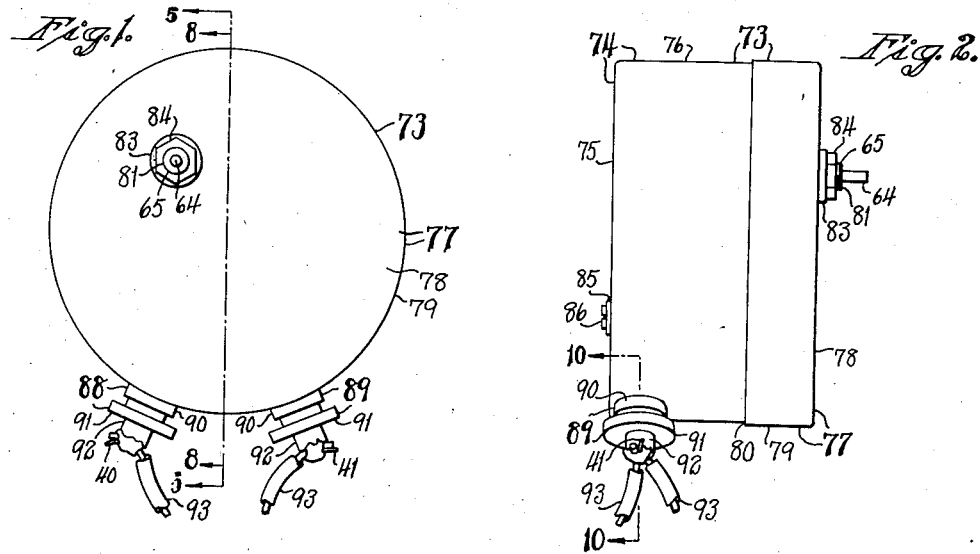
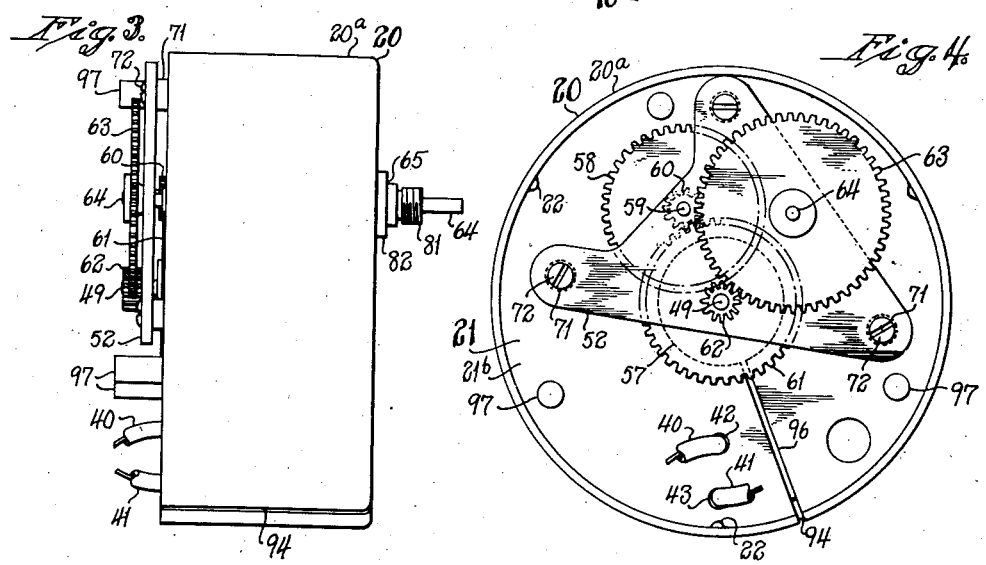
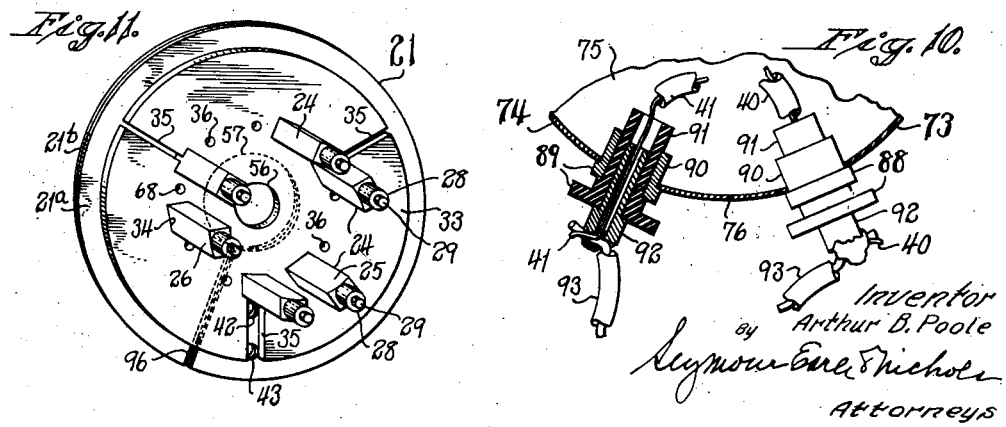
Inventor
Arthur B. Poole
by Seymour, Earle & Nichols
Attorneys

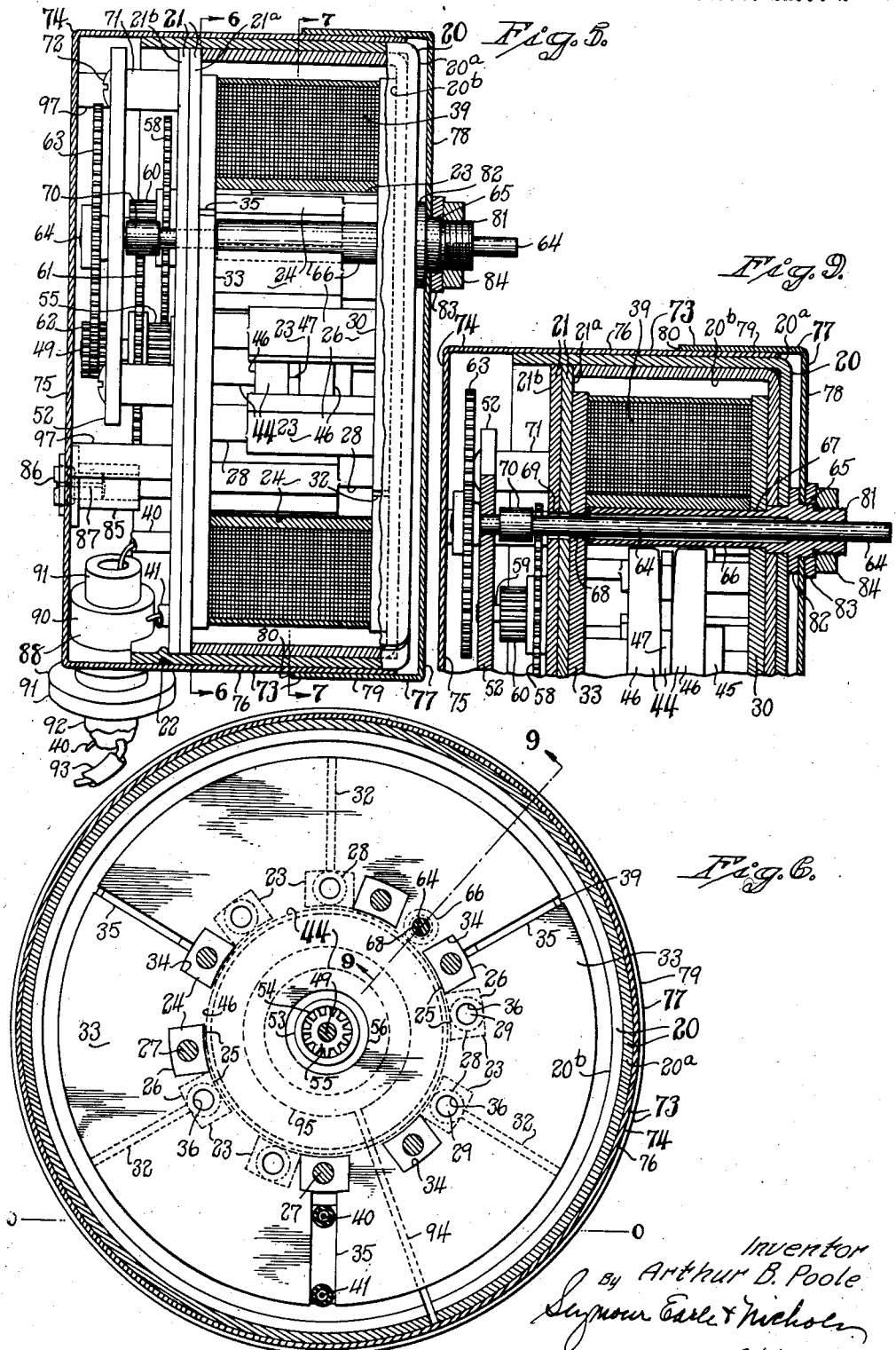

Sept. 5, 1939.　　　A. B. POOLE　　　2,171,987
SYNCHRONOUS ELECTRIC MOTOR STRUCTURE
Filed Dec. 3, 1937　　　4 Sheets-Sheet 3
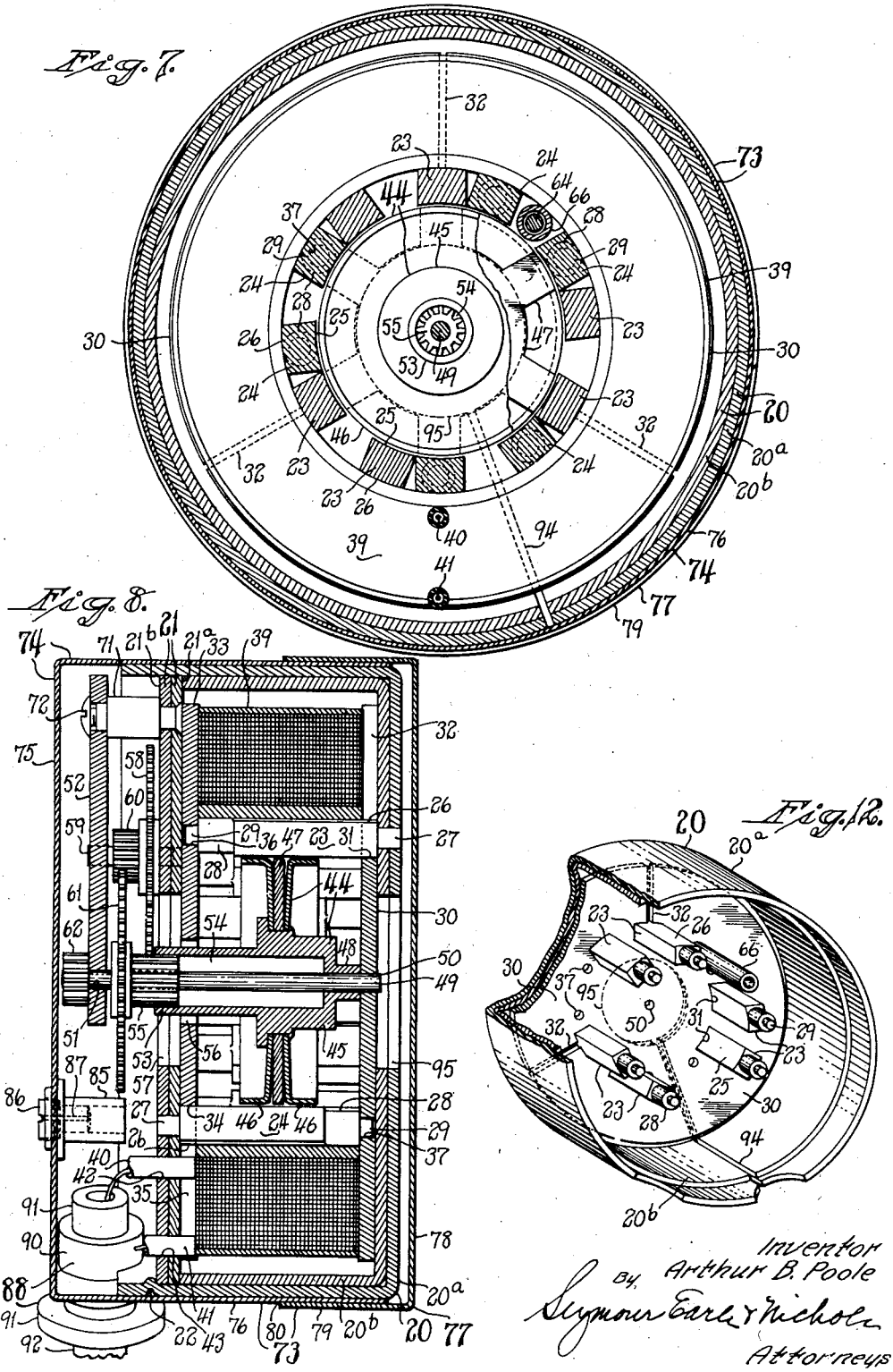
Inventor
Arthur B. Poole
by Seymour Earle & Nichols
Attorneys Sept. 5, 1939.  A. B. POOLE  2,171,987
SYNCHRONOUS ELECTRIC MOTOR STRUCTURE
Filed Dec. 3, 1937  4 Sheets-Sheet 4

Inventor
Arthur B. Poole
by Seymour Earle Nichols
Attorneys

Patented Sept. 5, 1939

2,171,987

UNITED STATES PATENT OFFICE 2,171,987

SYNCHRONOUS ELECTRIC MOTOR STRUCTURE

Arthur B. Poole, Bristol, Conn., assignor to The E. Ingraham Company, Bristol, Conn., a corporation of Connecticut Application December 3, 1937, Serial No. 177,839

17 Claims. (Cl. 172—278)

This invention relates to an improvement in synchronous electric motor structures and is primarily concerned with a synchronous electric motor structure for use in propelling clocks and other time instruments.

One of the objects of the present invention is to provide a superior synchronous electric motor structure in which ample power is combined with maximum compactness.

A further object is to provide a superior synchronous electric motor structure characterized by its capacity to operate satisfactorily over long periods of continuous use without requiring the renewal of its initial supply of lubricant.

Another object of the present invention is to provide a superior synchronous electric motor structure which despite high torque output will operate with a minimum temperature rise.

A still further object is to provide a superior synchronous electric motor structure which will not be affected to a substantially harmful degree by adjacent extraneous magnetic material such, for instance, as sheet-steel or iron clock-cases or parts.

Still another object of the present invention is to provide a superior synchronous electric motor structure characterized by its provision with a superior construction and arrangement of parts whereby the hum occasioned by alternating or pulsating currents and moving parts is minimized.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in front-end elevation of a synchronous electric motor structure embodying the present invention;

Fig. 2 is a view thereof in side elevation;

Fig. 3 is a view of the motor structure in side elevation with the housing omitted;

Fig. 4 is a view in rear elevation of the motor structure with the housing omitted;

Fig. 5 is a view of the motor structure partly in side elevation and partly in transverse section taken on the line 5—5 of Fig. 1;

Fig. 6 is a sectional view taken on the line 6—6 of Fig. 5;

Fig. 7 is a sectional view taken on the line 7—7 of Fig. 5;

Fig. 8 is a sectional view somewhat like Fig. 5 save that it shows the parts more completely in section and is taken on the line 8—8 of Fig. 1;

Fig. 9 is a fragmentary sectional view taken on the line 9—9 of Fig. 6;

Fig. 10 is a fragmentary sectional view taken on the line 10—10 of Fig. 2;

Fig. 11 is a perspective view of the disk-like pole-unit;

Fig. 12 is a perspective view partly in section of the cup-shaped pole-unit;

Figure 13:
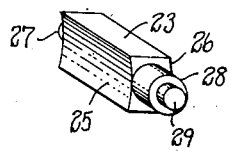
Fig. 13 is a perspective view of one of the bar-like salient poles.
Figure 14:
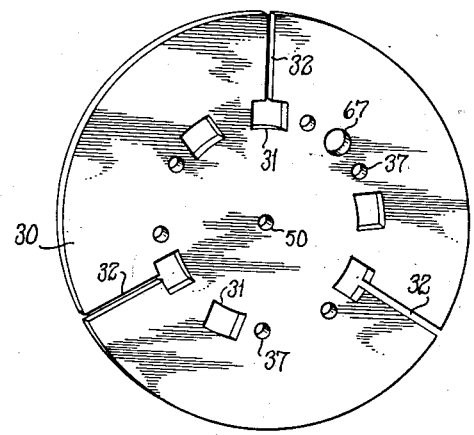
Fig. 14 is a perspective view of the shading-disk of the cup-shaped pole-unit.
Figure 16:
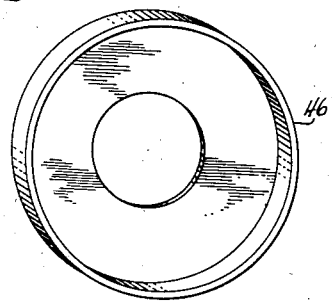
Fig. 16 is a perspective view of one of the cup-shaped members of the rotor-unit.
Figure 15:
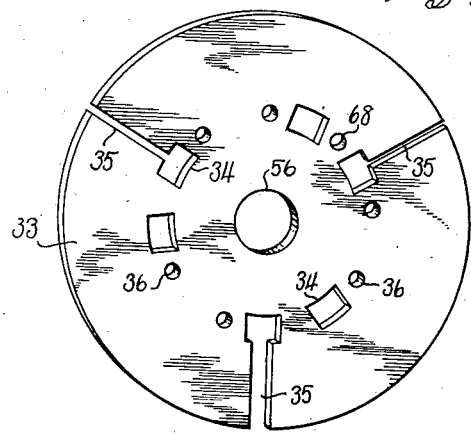
Fig. 15 is a similar view of the shading-disk of the disk-like pole-unit.
Figure 17:
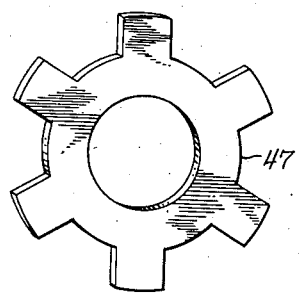
Fig. 17 is a similar view of the salient-pole member of the rotor-unit.

The embodiment of the present invention herein chosen for illustration includes a cup-shaped pole-unit, generally designated by the reference character 20, and a complementary disk-like pole-unit, generally designated by the reference character 21, both of which are composed of suitable magnetic material, such, for instance, as soft iron, silicon steel, or the like. The cup-shaped pole-unit 20 includes a relatively-deep outer cup-shaped member 20ª and a relatively-shallow cup-shaped inner member 20ᵇ tightly fitted within the said outer member 20ª. The disk-like pole-unit 21 comprises inner and outer disks 21ª and 21ᵇ respectively, which fit within the open forward end of the outer cup-shaped member 20ª of the cup-shaped pole-unit 20 and bear against the outer edge of the inner cup-shaped member 20ᵇ of the said pole-unit 20, as is particularly well shown in Figs. 5, 8 and 9.

For the purpose of rigidly securing the pole-units 20 and 21 together, the periphery of the outer member 20ª of the pole-unit 20 is indented at spaced intervals as at 22 to displace metal over the rear face of the outer member 21ᵇ of the disk-like pole-unit 21.

Projecting rearwardly from the end-wall of the cup-shaped pole-unit 20 is an annularly-arranged series of bar-like salient poles 23 (six, more or less) formed of suitable magnetic material and arranged in (three, more or less) relatively-closely-spaced pairs around the axis of the structure formed by the complemental pole-units 20 and 21 with relatively-wide gaps between the respective pairs of salient poles. In a similar manner, the disk-like pole-unit 21 is provided with a corresponding annular series of bar-like, but oppositely-projecting, salient poles 24, also formed of magnetic material, and like the salient poles 23 before referred to, arranged in relatively-closely-spaced pairs with a relatively-wide gap between the respective pairs. The pairs of salient poles of one pole-unit fit into the relatively-wide gaps between the salient poles of the complemental pole-unit. The spacing of the salient poles 23 and 24 is such that when the two pole-units 20 and 21 are assembled together, the salient poles of like polarity are spaced relatively-widely apart while the salient poles of unlike polarity are spaced in very close proximity to each other, as will be apparent by reference to Figs. 6 and 7.

The salient poles 23 and 24 correspond to each other in size and form, so as to be interchangeable for the purpose of economy of manufacture, and each of said salient poles throughout the major portion of its length is of substantially-rectangular form in cross-section though having a slightly-concave inner face 25 and a slightly-convex outer face 26 extending substantially concentrically with respect to the motor structure. Each of the salient poles 23 and 24 is formed at one end with a cylindrical shank 27 which extends with a drive fit into a suitable perforation in the particular pole-unit 20 or 21, of which it forms a part, to firmly anchor the particular salient pole rigidly in place. Each of the salient poles 23 and 24 is also formed at its end opposite its shank 27 with a relatively-large cylindrical portion 28 and a relatively-small-diameter cylindrical stabilizing-tenon 29.

Positioned against the inner face of the inner cup-shaped member 20b of the pole-unit 20 is a shading-disk 30 formed of copper or other suitable high electro-conductive material, and formed with an annular series of substantially-rectangular perforations 31, each of which is shaped and located so as to snugly fit over the base-portion of one of the bar-like salient poles 23 of the pole-unit 20, and thus supplement the action of the shank 27 thereof in holding the said salient pole in properly oriented position. Each alternate one of the polygonal perforations 31 is intersected by a radial slot 32 which thus interrupts the flow of induced currents in the portion of the disk 30 around the particular one of the salient poles 23 which extends through one of the said intersected perforations 31. The remaining three perforations 31 are not intersected by slots, but the material of the shading-disk 30 which surrounds them is continuous and provides a complete electrical path for the flow of induced current around the particular three salient poles 23 projecting through the said unintersected perforations. From the foregoing, it will be seen that each alternate one of the salient poles 23 is shaded, so to speak, by the shading-disk 30, so that the magnetic flux in these particular salient poles will lag with respect to the magnetic flux in the remaining three unshaded salient poles 23, so as to produce a rotating field effect.

Located against the inner face of the disk-like pole-unit 21 is a shading-disk 33 corresponding in its main features and functions to the shading-disk 30, just above described, and like the same provided with six substantially-rectangular perforations 34 which snugly fit over the bar-like salient poles 24 of the said disk-like pole-unit 21. The material of the shading-disk 33 (copper or the like) around three of the six perforations 34 is electrically continuous, so as to provide for the flow of induced current around the particular three salient poles 24 respectively extending therethrough. The remaining three perforations 34 in the shading-disk 33 are intersected by radial slots 35 extending inwardly from the outer edge of the disk 33 and serving to interrupt the flow of current around the particular three salient poles 24 extending through these latter three perforations. In this manner, it will be seen that three of the salient poles 24 of the disk-like pole-unit 21 are shaded by the shading-disk 33, so that the magnetic flux flowing therethrough is delayed with respect to the magnetic flux flowing through the remaining three salient poles 24 which extend through the particular perforations 34 which are intersected by the radial slots 35 above described. This shading of alternate salient poles 24 produces a rotating field effect similar to that described in connection with the salient poles 23 of the pole-unit 20.

The tenon 29 at the otherwise free end of each of the salient poles 23 is slightly tapered for being forced with a drive fit into a correspondingly-located perforation 36 in the shading-disk 33, so that the said salient poles 23 are firmly held at each of their respective opposite ends against displacement or vibration. In a similar manner, the tenons 29 of each of the salient poles 24 are tapered for being forced with a drive fit into an aligned perforation 37 in the shading-disk 30, so that the said salient poles 24 are also firmly held at each of their respective opposite ends.

Surrounding the salient poles 23 and 24, which, as before explained, are arranged in an annular series, is an energizing-coil 39 which is provided with two insulated leads 40 and 41 which extend rearwardly through a wider one of the three radial slots 35 in the adjacent shading-disk 33 and pass respectively through perforations 42 and 43 in the disk-like pole-unit 21 and thence to suitable terminals, as will be hereinafter described.

Fitting within the central annular space outlined by the annular series of salient poles 23 and 24, before described, is a rotor-unit which for convenience of description will be generally designated by the reference character 44. The said rotor-unit includes a rotor-hub 45 which is preferably made of brass or the like, and upon which is rigidly mounted a pair of corresponding but oppositely-facing cup-shaped rotor-elements 46—46 which are preferably formed of permanent magnet steel or its equivalent, and which are spaced from each other by a salient-poled rotor-unit 47 which may be conveniently made of soft iron or other non-permanent magnetic material. The cup-shaped rotor-elements 46—46 are smooth upon their periphery and are not provided with geometrically-salient poles, but owing to their permanent-magnet character are adapted to receive magnetic "spottings," so to speak, which will be impressed upon them by the adjacent salient poles of the stator structure, in accordance with well understood principles in the art.

The rotor-hub 45 is provided at its forward end with a sleeve-like bearing-portion 48 which bears upon the adjacent surface of a center-arbor 49 which is journaled at its forward end in a bearing-opening 50 in the adjacent shading-disk 30. The said arbor 49 bears at its rearward end in a bearing-opening 51 formed in a bearing-plate 52 located in spaced relationship rearwardly of the disk-like pole-unit 21, before referred to. The rear end of the rotor-hub 45 is formed with a rearwardly-extending sleeve-like portion 53 having an axial passage 54 extending therethrough, as well as through the main portion of the adjacent rotor-hub 45 proper, as is clearly shown in Fig. 8. The diameter of the passage 54, just referred to, is considerably larger than the diameter of the center-arbor 49 which extends therethrough, and receives at its rear end with a drive fit the forward end of a pinion 55 which bears, with freedom for rotation, upon the said center-arbor 49 and permits the access of oil to the interior of the hub 45 via the slots between its gear-teeth.

As thus constructed and arranged, the rotor-hub 45 bears at its forward end upon the independently-rotatable center-arbor 49 by virtue of the sleeve 48 and also bears at its rear end upon the said center-arbor by virtue of the pinion 55, which to all intents and purposes is a part of the said rotor-hub. The sleeve-like portion 53 of the rotor-hub 45 projects rearwardly through a central clearance-opening 56 in the adjacent shading-disk 33 and through a clearance-opening 57 which is located centrally of the disk-like pole-unit 21.

The pinion 55 meshes into and drives a gear-wheel 58 (Figs. 5 and 8) which is mounted for rotation upon a shaft 59 mounted at its respective opposite ends in the disk-like pole-unit 21 and the bearing-plate 52. The said gear-wheel 58 rigidly carries a pinion 60 which in turn meshes into and drives a gear-wheel 61 which is staked or otherwise secured to the center-arbor 49 at a point intermediate the rear end of the pinion 55 of the rotor-hub 45 and the inner face of the bearing-plate 52. The extreme rear portion of the center-arbor 49 immediately to the rear of the bearing-plate 52, has staked or otherwise secured to it a pinion 62 which in turn meshes into and drives a gear-wheel 63 (Figs. 4 and 5), which is staked or otherwise secured to the rear end of a power-output shaft 64 immediately to the rear of the bearing-plate 52 before referred to.

The rear end of the power-output shaft 64 is journaled in the bearing-plate 52 and its front portion is journaled in the forward portion of a bearing-bushing 65 which extends through and is rigidly mounted in the front-end wall of the cup-shaped pole-unit 20. The bearing-bushing 65 is formed with a relatively-slender rearwardly-extending oil-guard 66 projecting through a perforation 67 in the adjacent shading-disk 30, as is clearly illustrated in Fig. 9.

The interior of the tubular oil-guard 66 of the bearing-bushing 65 is clear of the power-output shaft 64 and extends at its rear end into a position closely adjacent the shading disk 33 and a perforation 68 therein through which latter the said power-output shaft 64 extends, as clearly shown in Fig. 9. The said power-output shaft 64 also extends through a clearance-passage 69 formed in the disk-like pole-unit 21 in line with the clearance-passage 68 in the adjacent shading-disk 33. To prevent undue rearward axial displacement of the power-output shaft 64, the same is provided with a collar 70 which is rigidly fixed thereon and which is located immediately in front of the bearing-plate 52. The said bearing-plate 52 is attached to and held in spaced relationship with respect to the disk-like pole-unit 21 by means of three (more or less) pillars 71 which are riveted at their forward ends in the said pole-unit 21 and to the rear end of which the said bearing-plate 52 is attached by means of suitable screws 72 or the like.

The entire structure above described, save for the forward end of the bearing-bushing 65 and the similar end of the power-output shaft 64, is enclosed within a two-part housing, generally designated by the reference character 73 and which may, if desired, be made of relatively-light sheet-steel or other suitable material of an oil-tight nature. The said housing 73 includes a relatively-deep cup-shaped member, generally designated by the reference character 74 and which has a substantially-flat rear-end wall 75 and a deep annular flange 76. The forward or open end of the cup-shaped housing-member 74 is closed by a flanged housing-cap, generally designated by the reference character 77 and which includes a substantially-flat front-end wall 78 and a relatively-shallow rearwardly-projecting annular flange 79 which fits over the exterior of the adjacent end of the flange 76 of the main housing-member 74, and is preferably soldered or otherwise sealed at 80 to the said member 74.

The front-end wall 78 of the cap 77 fits over the externally-threaded forward end 81 of the bearing-bushing 65 and is held in seated engagement with an annular flange 82 on the said bushing by means of a washer 83 and a nut 84 upon the portion 81 of the said bushing, to thus guard against the leakage of oil from within the housing 73.

Preferably, and as shown in Figs. 5 and 8, the rear-end wall 75 of the main housing-member 74 is provided with a bushing 85 through which oil may be introduced into a chamber provided in the interior of the housing 73 by the end wall 35 thereof and the inwardly-spaced disk-like pole-unit 21, which latter partitions the energizing-coil from the oil chamber. The bushing 85 is sealed against the escape of oil by means of a closure-screw 86 having a small vent-passage 87 therein.

The lead 40 of the energizing-coil 39 leads to a terminal, generally designated by the reference character 88, which is mounted in the annular flange-portion 76 of the main housing-member 74, as is also a corresponding terminal 89 to which the lead 41 of the energizing-coil 39 is attached in a manner as will be presently described.

As before noted, each of the terminals 88 and 89 correspond, so that a description of one will serve for both. Each of the said terminals includes a bushing 90 of brass or other suitable material, which may be soldered in place to the flange 76 of the main housing-member 74, to insure oil tightness. Tightly fitted into the bushing 90, just referred to, so as to prevent the escape of oil, is an insulating-bushing 91 which in turn receives, with a snug oil-tight fit, a terminal-sleeve 92 formed of brass or other suitable electro-conductive material. The naked wire of the particular lead 40 or 41 which is to be connected to a given terminal, is passed outwardly through the axial passage in the terminal-sleeve 92 and is there soldered to the outer face of the said terminal-sleeve, together with the adjacent end of a supply-wire 93. The soldering just referred to not only serves to connect the supply-wire and terminal-wire of the coil and the terminal sleeve 92 together, but also serves to seal the outer end of the axial passage through the said terminal-sleeve, so as to guard against the egress of oil.

To minimize the flow of stray induced current in the cup-shaped pole-unit 20, both of the cup-shaped members 20ᵃ and 20ᵇ thereof are slotted, as at 94, which slots extend radially from the central clearance-opening 95 in the said pole-unit 20 outwardly through both the end-wall thereof and the flange-portion thereof. For a purpose similar to that just described, the disk-like pole-unit 21 is also provided with a radial slot 96, as is shown particularly well in Fig. 11. Preferably, and as indicated in Fig. 6, sufficient oil is introduced into the housing 73 through its bushing 85 to maintain an oil-level substantially corresponding to the line O—O in the said Fig. 6. Preferably, the oil-level is such than when the motor structure is tilted into various positions, the said oil-level will not be sufficient to rest above either the inner end of the bushing 85 or the inner end of the tubular oil-guard 66.

For the purpose of properly spacing the motor structure within the housing 73, the disk-like pole-unit 21 is provided with three (more or less) spacing-posts 97 which extend into engagement with the rear wall 75 of the main housing-member 74.

By so constructing and arranging the parts that the energizing-coil 39, as well as the rotor and associated elements, are enclosed within the housing 73 and are blanketed by the oil therein, the cool running of the motor is insured, since the oil within the housing acts as a heat conductor to transmit such heat as may be generated within the structure to the housing 73 for dissipation by radiation and convection thereby.

A very quiet-running motor structure is obtained by means of the construction and arrangement shown and described, since in addition to inherent quietness, such noises as may occur within the housing 73 will largely be forced to pass through the contained oil, and when the sound reaches the said housing, it will be largely reflected back by the latter, owing to the reflecting effect which occurs when sound endeavors to pass from one transmitting medium to another.

Furthermore, by positioning the copper or other relatively non-resonant shading-disk 30 or 33 immediately adjacent the end-walls respectively of the pole-units 20 and 21, the vibration of the latter is very materially dampened. As will be noted by the accompanying drawings, each shading-disk 30 or 33 serves not only as a stabilizer for the salient poles extending therethrough, but also acts as a stabilizer for the otherwise free end of the salient poles extending through the complemental shading-disk. The said shading-disks, it will be noted, also serve as supports for certain of the gear-train elements.

By reference to Fig. 7 in particular, it will be seen that the oil-guard portion 66 of the bearing-bushing 65 through which the power-output shaft 64 extends is located intermediate the energizing-coil 39 and the rotor-unit 44, as well as laterally intermediate two of the salient poles 24, so that the tendency of the lubricant to leak outwardly through the said bearing-bushing or its equivalent when the motor structure is tilted, will be minimized.

By providing the salient poles 23—24 with the cylindrically cut-back portion 28, end or axial draft upon the rotor-unit is minimized, which further cuts down or minimizes any tendency of the said rotor structure to vibrate axially.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A synchronous electric motor structure, including in combination: a hollow field structure having a number of spaced salient poles arranged for ordered relative development of polarity of opposite sign alternately therein; a ring-like energizing-coil located within the said hollow field structure; the said salient poles extending into the said ring-like energizing-coil and the latter being arranged to magnetize the said salient poles to establish pulsating magnetic flux therein; a rotor also located within the said ring-like energizing-coil in the said hollow field structure and positioned in the path of the said magnetic flux to be driven thereby; and an oil-retaining housing enveloping the said hollow field structure, the said ring-like energizing-coil within said field structure, and also the rotor within the latter; the oil-retaining housing being constructed and arranged to receive oil for its substantially-free disposition therein with respect to the said parts enveloped in the oil-retaining housing, and being also sealed against escape of oil therefrom.

2. A synchronous electric motor structure, including in combination: a hollow field structure having a number of spaced salient poles arranged for ordered relative development of polarity of opposite sign alternately therein; a ring-like energizing-coil located within the said hollow field structure; the said salient poles extending into the said ring-like energizing-coil and the latter being arranged to magnetize the said salient poles to establish pulsating magnetic flux therein; a rotor also located within the said ring-like energizing coil in the said hollow field structure and positioned in the path of the said magnetic flux to be driven thereby; an oil-retaining housing enveloping the said hollow field structure, the said ring-like energizing-coil within said field structure, and also the rotor within the latter; a speed-reducing train operatively connected to the said rotor and located within the said oil-retaining housing intermediate one wall thereof and the said hollow field structure, and having a power-output element projecting outwardly through the said oil-retaining housing; the oil-retaining housing being constructed and arranged to receive oil for its substantially-free disposition therein with respect to the said parts enveloped in the oil-retaining housing, and being also sealed against escape of oil therefrom.

3. A synchronous electric motor structure, including in combination: a hollow field structure having a number of spaced salient poles arranged for ordered relative development of polarity of opposite sign alternately therein; a ring-like energizing-coil located within the said hollow field structure; the said salient poles extending into the said ring-like energizing-coil and the latter being arranged to magnetize the said salient poles to establish pulsating magnetic flux therein; a rotor also located within the said ring-like energizing-coil in the said hollow field structure and positioned in the path of the said magnetic flux to be driven thereby; an oil-retaining housing enveloping the said hollow field structure, the said ring-like energizing-coil within said field structure, and also the rotor within the latter; and a speed-reducing train located exteriorly of the said hollow field structure and within the said oil-retaining housing intermediate a wall of the same and the said hollow field structure, and having a power-output element extending through the said hollow field structure to the opposite side thereof from the said speed-reducing train and outwardly through the said oil-retaining housing; the oil-retaining housing being constructed and arranged to receive oil for its substantially-free disposition therein with respect to the said parts enveloped in the oil-retaining housing and being also sealed against escape of oil therefrom.

4. A synchronous electric motor structure, including in combination: a hollow field structure having a number of spaced salient poles within its interior arranged for ordered relative development of polarity of opposite sign alternately therein; a ring-like energizing-coil located within the said hollow field structure; the said salient poles extending into the said ring-like energizing-coil and the latter being arranged to magnetize the said salient poles to establish pulsating magnetic flux therein; short-circuiting means around certain of the salient poles of the said hollow field structure and also located within the interior of the same; a rotor located within the said ring-like energizing-coil in the hollow field structure and positioned in the path of the said magnetic flux to be driven thereby; and an oil-retaining housing enveloping the said hollow field structure, short-circuiting means, energizing-coil and rotor; the oil-retaining housing being constructed and arranged to receive oil for its substantially-free disposition therein with respect to the said parts enveloped in the oil-retaining housing, and being also sealed against escape of oil therefrom.

5. A synchronous electric motor structure, including in combination: a hollow field structure having a number of spaced salient poles within its interior arranged for ordered relative development of polarity of opposite sign alternately therein; a ring-like energizing-coil located within the said hollow field structure; the said salient poles extending into the said ring-like energizing-coil and the latter being arranged to magnetize the said salient poles to establish pulsating magnetic flux therein; short-circuiting means around certain of the salient poles of the said hollow field structure and also located within the interior of the latter; a rotor located within the said ring-like energizing-coil in the hollow field structure and positioned in the path of the said magnetic flux to be driven thereby; an oil-retaining housing enveloping the said hollow field structure, short-circuiting means, said ring-like energizing-coil and rotor; and a speed-reducing train located within the said oil-retaining housing intermediate an end wall thereof and the said hollow field structure, and having a power-output element extending through the said hollow field structure and the short-circuiting means therein and through the opposite side of the said oil-retaining housing from the said speed-reducing train; the oil-retaining housing being constructed and arranged to receive oil for its substantially-free disposition therein with respect to the said parts enveloped in the oil-retaining housing, and being also sealed against escape of oil therefrom.

6. A synchronous electric motor structure, including in combination: a cylindrically-contoured hollow field structure having a number of spaced salient poles within its interior spaced inwardly from its periphery and arranged for ordered relative development of polarity of opposite sign alternately therein; a ring-like energizing-coil located within the said hollow field structure intermediate the periphery thereof and the salient poles therein; short-circuiting disk-like members located within the said hollow field structure on each of the respective opposite sides of the said energizing-coil therein and electrically encircling certain of the said salient poles thereof to create a rotating field effect; a rotor located within the hollow field structure in position to be driven by the magnetic flux applied to the same by the said energizing-coil; and an oil-retaining housing enveloping the said hollow field structure, short-circuiting means, energizing-coil and rotor; the oil-retaining housing being constructed and arranged to receive oil for its substantially-free disposition therein with respect to the said parts enveloped in the oil-retaining housing, and being also sealed against escape of oil therefrom.

7. A synchronous electric motor structure, including in combination: a field structure comprising two pole-units, each provided with salient poles and fitted together to form a hollow field structure; an energizing-coil within the said hollow field structure for magnetizing the same; a rotor located within the said hollow field structure in position to be driven by the magnetic flux applied to the said field structure by the said energizing-coil; and an oil-retaining housing enveloping the two pole-units of the said hollow field structure, the energizing-coil within said field structure, and also the rotor within the said field structure; the oil-retaining housing being constructed and arranged to receive oil for its substantially-free disposition therein with respect to the said parts enveloped in the oil-retaining housing, and being also sealed against escape of oil therefrom.

8. A synchronous electric motor structure, including in combination: a field structure comprising two pole-units, each provided with salient poles and fitted together to form a hollow field structure; two disk-like short-circuiting members respectively carried by one of the two said pole-units in position to electrically encircle certain of the salient poles thereof; a rotor located within the said hollow field structure in position to be driven by the magnetic flux applied to the salient poles thereof; an energizing-coil within the said hollow field structure and positioned intermediate the salient poles thereof and the outer wall thereof, and flanked on each of its respective opposite sides by one of the said short-circuiting disk-like members; and an oil-retaining housing enveloping the two pole-units of the said hollow field structure, the short-circuiting members therein, the energizing-coil within the said field structure, and also the rotor within the said field structure; the oil-retaining housing being constructed and arranged to receive oil for its substantially-free disposition therein with respect to the said parts enveloped in the oil-retaining housing, and being also sealed against escape of oil therefrom.

9. A synchronous electric motor structure, including in combination: a field structure comprising two pole-units, each provided with salient poles and fitted together to form a hollow field structure; an energizing-coil within the said hollow field structure for magnetizing the same; a rotor located within the said hollow field structure in position to be driven by the magnetic flux applied to the said field structure by the said energizing-coil; an oil-retaining housing enveloping the two pole-units of the said hollow field structure, the energizing-coil within said field structure, and also the rotor within the said field structure; and a speed-reducing train located within the said oil-retaining housing intermediate an end wall thereof and one of the two said pole-units, and having a power-output element projecting through both of the said pole-units and thence outwardly through the said oil-retaining housing at a point on the opposite side of the said field structure from the side thereon which the said speed-reducing train is located; the oil-retaining housing being constructed and arranged to receive oil for its substantially-free disposition therein with respect to the said parts enveloped in the oil-retaining housing, and being also sealed against escape of oil therefrom.

10. A synchronous electric motor structure, including in combination: a field structure comprising a cup-shaped pole-unit having one substantially-closed end and one substantially-open end, and a complemental disk-like pole-unit substantially closing the substantially-open end of the said cup-shaped pole-unit in spaced relationship with respect to the closed end wall thereof, each of the said pole-units being provided with complemental salient poles; an energizing-coil located within the said cup-shaped pole-unit intermediate the substantially-closed end wall thereof and the said disk-like pole-unit; a rotor located within the said field structure in position to be driven by the magnetic flux applied to the said field structure by the said energizing-coil; and an oil-retaining housing enveloping the said cup-shaped and the said disk-like pole-units, the said energizing-coil and the said rotor.

11. A synchronous electric motor structure, including in combination: a field structure comprising a cup-shaped pole-unit having one substantially-closed end and one substantially-open end, and a complemental disk-like pole-unit substantially closing the substantially-open end of the said cup-shaped pole-unit in spaced relationship with respect to the substantially-closed end thereof, each of the said pole-units being provided with complemental salient poles; an energizing-coil located within the said cup-shaped pole-unit intermediate the substantially-closed end thereof and the said disk-like pole-unit; a rotor located within the said field structure in position to be driven by the magnetic flux applied to the said field structure by the said energizing-coil; a speed-reducing train operatively connected to the said rotor for being driven thereby and organized with and carried by one of the said pole-units and having a power-output element projecting through the other of said pole-units; and an oil-retaining housing enveloping said cup-shaped and the said disk-like pole-units, the said energizing-coil, speed-reduction train and the said rotor, and provided with a pasage through which the power-output element of the said speed-reducing train projects.

12. A synchronous electric motor structure, including in combination: a cup-shaped pole-unit having one substantially-closed end and one substantially-open end, and having a stop-shoulder located in its interior adjacent its substantially-open end and also provided with salient poles for cooperation with a rotor; a disk-like pole-unit fitting within the substantially-open end of the said cup-shaped pole-unit in engagement with the internal stop-shoulder therein and having salient poles complementing the salient poles of the said cup-shaped unit; an energizing-coil located within the said cup-shaped pole-unit intermediate the substantially-closed end thereof and the said disk-like pole-unit; and a rotor also located in the said cup-shaped pole-unit between the substantially-closed end thereof and the said disk-like pole-unit.

13. A synchronous electric motor structure, including in combination: a cup-shaped pole-unit having one substantially-closed end and one substantially-open end, and having a stop-shoulder located in its interior adjacent its substantially-open end and also provided with salient poles for cooperation with a rotor; a disk-like pole-unit fitting within the substantially-open end of the said cup-shaped pole-unit in engagement with the internal stop-shoulder therein and having salient poles complementing the salient poles of the said cup-shaped unit; an energizing-coil located within the said cup-shaped pole-unit intermediate the substantially-closed end thereof and the said disk-like pole-unit; a rotor also located in the said cup-shaped pole-unit between the substantially-closed end thereof and the said disk-like pole-unit; and a speed-reducing train operatively connected to the said rotor for being driven thereby and organized with and carried by the said disk-like pole-unit.

14. A synchronous electric motor structure, including in combination: a cup-shaped pole-unit comprising one relatively-deep cup-shaped member and one relatively-shallow cup-shaped member fitted within the said relatively-deep cup-shaped member; a second pole-unit fitting within the relatively-deep cup-shaped member of the said pole-member and seating against the edge of the relatively-shallow cup-shaped member thereof; salient poles on each of the said pole-units; an energizing-coil located within the said cup-shaped pole-unit; and a rotor also located in the said cup-shaped pole-unit in cooperative relationship with respect to the salient poles of both of the said pole-units.

15. A synchronous electric motor structure including in combination: a plurality of annularly-spaced salient poles arranged for ordered relative development of polarities of opposite signs alternately therein; a ring-like energizing-coil for magnetizing the salient poles; a rotor positioned to be synchronously rotated by magnetic-flux applied to the salient poles by the ring-like energizing-coil; and oil-retaining structure for the said parts; the said rotor, the said ring-like energizing-coil and the said salient poles being concentrically arranged within the said oil-retaining structure about a common axis; the said oil-retaining structure having the portions thereof paralleling the said axis, each spaced a substantially-uniform distance from the said axis throughout the length of the said portions; the said oil-retaining structure enveloping the said rotor, ring-like energizing-coil and salient poles and being constructed and arranged to receive oil for its substantially-free disposition therein with respect to the said parts enveloped by the oil-retaining structure and being also sealed against escape of oil therefrom.

16. A synchronous electric motor structure including in combination: a plurality of annularly-spaced salient poles arranged for ordered relative development of polarities of opposite signs alternately therein; a ring-like energizing-coil, the said salient poles extending into the said ring-like energizing-coil to be magnetized thereby; a rotor positioned adjacent the said ring-like energizing-coil in position to be synchronously rotated by magnetic-flux applied to the salient poles by the said ring-like energizing-coil; and oil-retaining structure for the said parts; the said rotor, the said ring-like energizing-coil and the said salient poles being concentrically arranged within and enveloped by the said oil-retaining structure; the said oil-retaining structure being constructed and arranged to receive oil for its substantially-free disposition therein with respect to the said parts enveloped by the oil-retaining structure and being also sealed against escape of oil therefrom.

17. A synchronous electric motor structure including in combination: a plurality of annularly-spaced salient poles arranged for ordered relative development of polarities of opposite signs alternately therein; a ring-like energizing-coil, the said salient poles extending into the said ring-like energizing-coil to be magnetized thereby; a rotor positioned adjacent the said ring-like energizing-coil in position to be synchronously rotated by magnetic-flux applied to the salient poles by the said ring-like energizing-coil; a speed-reducing train operatively connected to the said rotor for being driven thereby; and oil-retaining structure for the said parts; the said rotor, the said ring-like energizing-coil and the said salient poles being concentrically arranged within the oil-retaining structure and together with the said speed-reducing train being enveloped by the said oil-retaining structure; the said oil-retaining structure being constructed and arranged to receive oil for its substantially-free disposition therein with respect to the said parts enveloped by the oil-retaining structure and being also sealed against escape of oil therefrom.

ARTHUR B. POOLE.